(12) United States Patent
Pan (10) Patent No.: US 10,495,511 B2
(45) Date of Patent: Dec. 3, 2019

(54) OPTICAL RADIATION MEASUREMENT METHOD BASED ON LIGHT FILTER UNITS AND APPARATUS THEREOF

(71) Applicant: EVERFINE PHOTO-E-INFORMATION CO., LTD, Hangzhou, Zhejiang Province (CN)

(72) Inventor: Jiangen Pan, Hangzhou (CN)

(73) Assignee: EVERFINE PHOTO-E-INFORMATION CO., LTD. (CN)

( * ) Notice: Subject to any disclaimer, the term of this patent is extended or adjusted under 35 U.S.C. 154(b) by 99 days.

(21) Appl. No.: 15/523,382

(22) PCT Filed: Apr. 15, 2015

(86) PCT No.: PCT/CN2015/076602
§ 371 (c)(1),
(2) Date: Apr. 29, 2017

(87) PCT Pub. No.: WO2016/065856
PCT Pub. Date: May 6, 2016

(65) Prior Publication Data
US 2017/0241833 A1 Aug. 24, 2017

(30) Foreign Application Priority Data
Oct. 30, 2014 (CN) .......................... 2014 1 0596998

(51) Int. Cl.
*G01J 3/46* (2006.01)
*G01J 1/04* (2006.01)
(Continued)

(52) U.S. Cl.
CPC ............... *G01J 1/0488* (2013.01); *G01J 1/10* (2013.01); *G01J 1/4228* (2013.01); *G01J 3/465* (2013.01);
(Continued)

(58) Field of Classification Search
CPC ........ G01J 3/0294; G01J 3/2823; G01J 3/465; G01J 3/51; G01J 1/0488
See application file for complete search history.

(56) References Cited

U.S. PATENT DOCUMENTS 5,602,394 A * 2/1997 Dombrowski ........ G01J 3/2823
250/334
5,717,605 A * 2/1998 Komiya .................... G01J 3/02
250/578.1

(Continued)

*Primary Examiner* — Thanh Luu
(74) *Attorney, Agent, or Firm* — PROI Intellectual Property US (57) ABSTRACT

The present invitation relates to an optical radiation measurement method based on light filter units, comprising the steps of: 1) providing characteristic filter units and correction light filter units in front of detection units to obtain multiple measured response values of an object to be detected; and, 2) selecting one or more sampling regions within a waveband to be detected, and calculating, according to a corresponding simultaneous expression/equation system of the measured response values, a spectral power distribution within the waveband to be detected. In this method, by introducing a small number of correction light filter units, the spectral power distribution within the entire waveband to be detected can be obtained without using a large number of narrow waveband color filters. In addition, a light radiation measurement apparatus is disclosed.

18 Claims, 2 Drawing Sheets

(51) Int. Cl.
*G01J 1/10* (2006.01)
*G01J 1/42* (2006.01)
*G01J 3/51* (2006.01)
*G01J 3/52* (2006.01)
*G01J 1/02* (2006.01)

(52) U.S. Cl.
CPC ............ *G01J 3/51* (2013.01); *G01J 3/513* (2013.01); *G01J 3/524* (2013.01); *G01J 1/029* (2013.01)

(56) References Cited

U.S. PATENT DOCUMENTS

| | | | |
|---|---|---|---|
| 2010/0189321 A1* | 7/2010 | Otsuka | G01J 3/2823 382/128 |
| 2014/0111807 A1* | 4/2014 | Yin | G01J 3/28 356/402 |

* cited by examiner

OPTICAL RADIATION MEASUREMENT METHOD BASED ON LIGHT FILTER UNITS AND APPARATUS THEREOF

CROSS REFERENCE TO RELATED APPLICATIONS

The present application is the US national stage of International Patent Application PCT/CN2015/076602 filed on Apr. 15, 2015, which, in turn, claims priority to Chinese Patent Application CN 201410596998.6 filed on Oct. 30, 2014.

TECHNICAL FIELD OF THE INVENTION

The present invention relates to the field of optical radiation measurement and, in particular, to an optical radiation measurement method based on light filter units and an apparatus thereof.

BACKGROUND OF THE INVENTION

At present, there are two methods to measure optical radiation. One approach is to obtain the photometric and colorimetric quantities by measuring the spectral power distribution of an object to be detected; and, the other approach is to form various characteristic response functions (e.g., CIE tristimulus value matching functions, (hotopic/scotopic/mesopic) spectral luminous efficiency functions of human eyes, etc.) by using photoelectric detectors and characteristic color filters and then obtain the photometric quantity, the tristimulus value and the like of the object to be detected so as to calculate parameters such as color. Compared with the technical solutions in which the spectral power distribution of the object to be detected is accurately measured, a photoelectric detection system using a combination of color filters and photoelectric detectors is apparently more advantageous in terms of the measurement time and cost.

Conventionally, there are following methods to measure an object to be detected by using a combination of photoelectric detectors and color filters.

(1) A large number of narrow-band color filters are successively placed in front of detectors (e.g., silicon photocells, monochrome CCDs, etc.) (taking the visible light at 380 nm to 780 nm as example, in order to realize the resolution of 10 nm, at least 40 narrow-band color filters with a transmitted waveband of 10 nm are required). The detectors receive response values at different narrow-bands and then integrate a plurality of response values, so as to measure a spectral power distribution within a detection waveband and to obtain various photometric and colorimetric quantities according to the spectral power distribution. However, this method is realized by switching between a large number of narrow-band color filters, and is thus high in cost, complicated in apparatus structure, tedious in operation and time-consuming.

(2) Color filters with different spectral response characteristics are placed in front of detectors (e.g., silicon photocells, monochrome CCDs, etc.), and the response function of the detectors and the different color filters constitute different combined spectral response functions to realize the measurement of different photometric and colorimetric quantities. However, by this method, it is unable to obtain the spectral power distribution of the object to be detected, and this method is limited by various factors such as process, environment and cost. Moreover, there is a large difference between the actual spectral response function formed by the detectors and the color filters and the theoretical response function (e.g., the CIE tristimulus spectral response function), resulting in low measurement accuracy. Therefore, this method cannot be applied in high-accuracy measurement fields.

In addition, CN201464052U disclosed a multi-spectra temperature measurement device based on a color CCD, wherein a three-channel color filter with a narrow-band spectral transmittance response characteristic is placed in front of the color CCD, and the three narrow-band spectral transmittance responses have red, green and blue single-peak central wavelengths. During the measurement, light passes through this color filter, so that a plurality of measurement signals with different spectra may be obtained simultaneously. Thus, the measurement of color temperature is realized, and the demand for the measurement of a high-temperature field may be satisfied. However, this method cannot be applied in an occasion where more spectral measurements are needed.

In conclusion, in the prior art, due to the use of a spectrometer of high cost, or due to low measurement accuracy, tedious operation or single test function, the effects of high measurement accuracy, powerful function, simple operation, low cost and the like cannot be all realized.

SUMMARY OF THE INVENTION

In view of the deficiencies in the prior art, an objective of the present invention is to provide an optical radiation measurement method and an apparatus thereof, which are fast and accurate in measurement and has a wide range of application. The high-accuracy and fast measurement of a spectral power distribution of an object to be objected may be realized by a limited number of correction filter units, and a deviation between the actual response value measured by a photoelectric detector and the real value is effectively corrected based on the measured spectral power distribution and a theoretical characteristic response function, so that the accurate measurement of different response values is realized.

The present invention is realized by the following technical solutions. An optical radiation measurement method based on light filter units is provided, including one or more detection units, n (n≥2) characteristic filter units, and m (m≥2) correction filter units, wherein the combined spectral responsivity of the detection units and the characteristic filter units and the transmittance of the correction filter units are known; the characteristic filter units and the correction filter units are provided in front of the detection units, and a plurality of measured response values of an object to be detected are obtained by a combination of the both; and, one or more sampling regions are selected within a waveband to be detected, and a spectral power distribution within the waveband to be measured is calculated according to a corresponding simultaneous equations system of the measured response values.

In the present invention, by placing characteristic filter units and correction filter units in front of the detection units, an object to be detected is received by the detection units under different characteristic filter units and different correction filter units, to obtain a plurality of measured response values of the object to be detected. Since the measured response values correspond to a specific waveband to be detected, and several sampling regions are selected within the waveband to be detected, the measured response values may be mathematically expressed by the transmittance of the correction filter units, the combined spectral responsivity of the detection units and the characteristic filter units, and the average spectral power of the sampling regions. Then, the average power of the sampling regions may be solved by using the simultaneous equations system of the different measured response values, so that the spectral power distribution of the object to be detected within the waveband to be detected is obtained.

Compared with placing only the characteristic filter units in front of the detection units in the prior art, this technical solution innovatively introduces a small number of correction filter units on the basis of the conventional combinations of color filter units and detections units in the prior art, so that the high-accuracy spectral power distribution of the object to be detected may be obtained, and high-accuracy characteristic response values are thus obtained. The present invention does not need conventional spectrometers and other complicated configurations, and has the characteristics of high measurement accuracy, simple operation, powerful function, low cost and the like.

The present invention may be further defined and improved by the following technical solutions.

A corresponding waveband to be detected is determined by a combination of the m correction filter units, and the spectral power distribution of the waveband to be detected is obtained by the following specific steps:

1a) acquiring a certain measured response value under a same characteristic filter unit and one or more correction filter units (3), and acquiring n measured response values $A_1, \ldots A_k, \ldots, A_n$ within the waveband to be detected under different characteristic filter units; and 1c) selecting w (1≤w≤n) sampling regions within the waveband to be detected, selecting w measured response values to establish a simultaneous equations system, and calculating the average power $P(\lambda_1), \ldots P(\lambda_i), \ldots, P(\lambda_w)$ in the sampling regions, i.e., acquiring a spectral power distribution within the waveband to be detected.

Within the waveband to be detected, the measured response values of the detection units after passing through the $k^{th}$ characteristic filter unit is expressed as follows:

$$A_k = \sum_{i=1}^{w} P(\lambda_i) I_k(\lambda_i) \tau(\lambda_i) \Delta \lambda_i \quad (1)$$

where, $\Delta\lambda_i$ is the range of the $i^{th}$ sampling region; $P(\lambda_i)$ is the average power within the $i^{th}$ sampling region; $I_k(\lambda_i)$ is the combined spectral responsivity of the $k^{th}$ characteristic filter unit and the detection units within $\Delta\lambda_i$; and, $\tau(\lambda_i)$ is the transmittance of the correction filter units within $\Delta\lambda_i$.

It is to be noted that, the number of selectable sampling regions depends upon the number of the characteristic filter units, the number of sampling regions selected within the waveband to be detected should be less than or equal to the number of the characteristic filter units, and the type of the characteristic filter units determines the number of the expressions of the measured response values of the sampling regions. Specifically, it can be seen from the formula (1) that w≤n. If the number of the selected sampling regions is larger than the number of the characteristic filter units, the number of unknown parameters (the average power of the sampling regions) is larger than the number of equations, and the equations system cannot be solved.

Within the waveband to be detected, the sampling interval $\Delta\lambda_i$ and the combined spectral responsivity $I_k(\lambda_i)$ may be selected in different manners. $\Delta\lambda_i$ may be selected at equal intervals or unequal intervals. The sampling regions are not overlapped with each other, and the sum of all the sampling regions covers the whole correction waveband. $I_k(\lambda_i)$ is obtained by combining the spectral response functions of the characteristic filter units and the detection units. Within the waveband $\Delta\lambda_i$, $I_k(\lambda_i)$ is generally a fixed value. The fixed value may be an average value of the spectral response functions of the characteristic filter units and the detection units within the waveband $\Delta\lambda_i$, or may be a response value of the combined spectral response function of the both at a certain point or a weighted value of the combined spectral response function.

Taking a certain correction waveband of 400 nm to 440 nm as example, four characteristic filter units are included, and four sampling regions are selected within the waveband to be detected (w=4).

The 4 sampling regions may be selected at equal intervals, i.e., 400 nm-410 nm, 410 nm-420 nm, 420 nm-430 nm and 430 nm-440 nm. In this case, $\Delta\lambda_1$, $\Delta\lambda_2$, $\Delta\lambda_3$ and $\Delta\lambda_4$ are all 10 nm, $P(\lambda_1)$, $P(\lambda_2)$, $P(\lambda_3)$ and $P(\lambda_4)$ are the average spectral power within 400 nm-410 nm, 410 nm-420 nm, 420 nm-430 nm and 430 nm-440 nm, respectively, and $I_k(\lambda_1)$, $I_k(\lambda_2)$, $I_k(\lambda_3)$ and $I_k(\lambda_4)$ are the average value of the combined spectral responsivity of the characteristic filter units and the detection units within 400 nm-410 nm, 410 nm-420 nm, 420 nm-430 nm and 430 nm-440 nm, respectively.

The 4 sampling regions may also be selected at unequal intervals, i.e., 400 nm-404 nm, 404 nm-412 nm, 412 nm-424 nm and 424 nm-440 nm. In this case, $\Delta\lambda_1$, $\Delta\lambda_2$, $\Delta\lambda_3$ and $\Delta\lambda_4$ are 4 nm, 8 nm, 12 nm and 16 nm, respectively, $P(\lambda_1)$, $P(\lambda_2)$, $P(\lambda_3)$ and $P(\lambda_4)$ are the average spectral power within 400 nm-404 nm, 404 nm-412 nm, 412 nm-424 nm and 424 nm-440 nm, respectively, and $I_k(\lambda_1)$, $I_k(\lambda_2)$, $I_k(\lambda_3)$ and $I_k(\lambda_4)$ are average spectral responsivity within 400 nm-404 nm, 404 nm-412 nm, 412 nm-424 nm and 424 nm-440 nm, respectively.

The waveband to be detected may be a transmitted waveband of band-pass filters, or a combined transmitted waveband of band-pass light filters and/or long-pass filters and/or short-pass filters. Particularly, within the waveband to be detected, a waveband beyond all the combined transmitted wavebands may also be regarded as a correction waveband. In this case, the measured response values are obtained by subtracting the response values within all the combined transmitted wavebands from the total response value that is not added with the response values of the correction filters. For example, if the waveband to be detected ranges from 400 nm to 600 nm, correction wavebands of 400 nm to 440 nm, 460 nm to 500 nm, 500 nm to 540 nm and 560 nm to 600 nm are selected by using band-pass filters of 400 nm to 440 nm, a combination of long-pass filters having a cutoff wavelength of 460 nm and short-pass filters having a cutoff wavelength of 500 nm, a combination of band-pass filters of 500 nm to 600 nm and short-pass filters having a cutoff wavelength of 540 nm, and a combination of band-pass filters of 500 nm to 600 nm and long-pass filters having a cutoff wavelength of 560 nm; and 440 nm to 460 nm and 540 nm to 560 nm beyond all combined transmitted wavebands may be collectively regarded as a correction waveband.

The waveband to be detected may be selected from the whole waveband to be detected at equal wavelength intervals, to obtain spectral power distributions at equal wavelength intervals; or, the correction waveband is provided within deviation regions of the characteristic color filters to acquire a maximum deviation between the actual characteristic response function and the theoretical characteristic response function, so that a more accurate correction response value is obtained. The deviation regions of the characteristic color filters is a range within which a direction deviation or weighted deviation between the combined spectral responsivity function of the detection units and the characteristic filter units and the theoretical characteristic function is greater than a preset value.

After the spectral power distribution of the object to be detected is obtained, the theoretical characteristic functions corresponding to the characteristic filter units are known, and characteristic response values (i.e., various photometric and colorimetric quantities) are calculated by using the spectral power distribution within the detection waveband and in combination with the corresponding theoretical characteristic functions. For example, if the theoretical characteristic functions are spectral luminous efficiency functions of human eyes, various photometric quantities may be obtained; and, if the theoretical characteristic functions are CIE tristimulus value matching functions, a tristimulus value corresponding to the object to be detected may be obtained. Since the spectral power distribution is directly weighted or integrated with the theoretical characteristic functions, the accurate photometric and colorimetric quantities may be obtained, and the measurement accuracy is high.

Based on the spectral power distribution and theoretical characteristic functions of the object to be detected, high-accuracy theoretical response values are obtained by correcting the measured values by a spectral mismatch correction coefficient K. The spectral mismatch correction coefficient is calculated from the spectral power distributions of the object to be detected and a calibration light source, the theoretical characteristic functions, and the combined spectral responsivity of the detection units and the characteristic filter units, specifically:

$$K = \frac{\int_{\lambda 1}^{\lambda 2} P(\lambda)_t L(\lambda) d\lambda \int_{\lambda 1}^{\lambda 2} P(\lambda)_S I_k(\lambda) d\lambda}{\int_{\lambda 1}^{\lambda 2} P(\lambda)_t I_k(\lambda) d\lambda \int_{\lambda 1}^{\lambda 2} P(\lambda)_S L(\lambda) d\lambda}$$

where $P(\lambda)_t$ is the spectral power distribution of the object to be detected; $L(\lambda)$ is the theoretical characteristic response function; $I_k(\lambda)$ is the combined spectral response responsivity of the detection units and the characteristic filter units; $P(\lambda)_s$ is the spectral power distribution of the calibration light source; and, $(\lambda 1, \lambda 2)$ is the detection waveband of the detection units.

By correcting the characteristic response values, theoretical response values may be obtained within the whole detection waveband range directly by using the spectral power distribution; or, the measured response values may be corrected by calculating a response deviation within each correction waveband range. In this case, the correction waveband should be selected from deviation regions of the characteristic response functions.

As a technical solution, theoretical characteristic functions corresponding to the characteristic filter units are known, and the measured response values of the detection units are corrected by the spectral power distribution:

3a) no any correction filter unit is placed into the light path, and a measured full-waveband response value within the whole waveband to be detected is obtained under a specified characteristic filter unit;

3b) under the same characteristic filter units, the measured response values in m wavebands to be detected are obtained, and theoretical response values are calculated according to the spectral power distribution within correction wavebands and the corresponding theoretical characteristic functions, so that a response value deviation within each correction waveband is obtained; and 3c) the measured full-waveband response value is corrected by using the response value deviation obtained in 3b), to obtain a corrected full-waveband response value within the whole waveband to be detected.

Based on the acquisition of the spectral power distribution, in this technical solution, the response value of the detection units (i.e., the photometric and colorimetric quantities of the object to be detected) is further corrected. For example, if the combined spectral response function of the detection units and a certain characteristic filter unit is a $\bar{x}(\lambda)$ curve of the CIE tristimulus value matching function, an accurate $\bar{x}$ value may be obtained; if the combined spectral response function is a $\bar{y}(\lambda)$ curve, an accurate $\bar{y}$ value may be obtained; and, if the combined spectral response function is a $\bar{z}(\lambda)$ curve, an $\bar{z}$ accurate value may be obtained.

The present invention further discloses an optical radiation measurement apparatus for implementing the optical radiation measurement method, including one or more detection units, n (n≥2) characteristic filter units and m (m≥2) correction filter units, wherein the combined spectral responsivity of the detection units and the characteristic filter units and the transmittance of the correction filter units are known; and, the characteristic filter units and the correction filter units are placed in front of the detection units, and light goes through the correction filter units and characteristic filter units and is then received by the detection units.

As a technical solution, the correction filter units are band-pass filters; or, the correction filter units are a combination of band-pass filters and/or long-pass filters and/or short-pass filters. Generally, band-pass filters are arranged within a detection waveband, or long-pass filters and short-pass filters constitute band-pass regions, and transmitted wavebands of the band-pass filters or the band-pass regions are located within the detection waveband of the detection units. In addition, long-pass filters and short-pass filters may also be arranged at two ends of the detection waveband, to avoid the introduction of stray light into light beyond the detection waveband and ensure the measurement accuracy. In the present invention, the number of the correction filter units is not specifically limited. Generally, within a visible light waveband, the number m of the correction filter units satisfies the following condition: m≤10, so that the measurement time, equipment cost and instrument size are effectively reduced while meeting the spectral resolution.

The characteristic filter units of the present invention may be realized by the following technical solutions. For example, if the combined spectral response of the characteristic filter units and the detection units is a simulated CIE tristimulus response, a tristimulus value corresponding to the object to be detected may be obtained; or, if the combined spectral response of the characteristic filter units and the detection units is a simulated spectral luminous efficiency function of human eyes, various luminosity values may be obtained. Each of the characteristic filter units may further include a color filter having a constant transmittance of 1, i.e., a through hole. Correspondingly, the theoretical characteristic functions may include various technical solutions. For example, the theoretical characteristic functions are CIE color matching functions of tristimulus values, or CIE photopic vision spectral luminous efficiency functions of human eyes, and the like.

As a technical solution, the correction filter units are arranged on a correction wheel, and different correction filter units are placed into the light path in front of the detection units by rotating the correction wheel. The correction wheel may be a circular wheel disc, and different correction filter units are successively placed into the light path in a rotation manner or placed into the light path in other ways. The characteristic filter units may also be arranged on a color wheel, and the characteristic filter units are placed into the light path in a similar way to the correction filter units, or fixed opposite to the detection units.

In the present invention, by comparing the combined spectral response function of the detection units and the characteristic filter units and the theoretical characteristic function and determining the positions of the correction filter units according to the result of comparison, the technical purpose of obtaining the accurate photometric and colorimetric quantities by using a small number of correction filter units may be realized. During the practical measurement, m correction filter units may be arranged within the detection waveband in various ways, for example, being arranged at equal wavelength intervals, or being arranged according to a deviation region distribution.

(a) If the transmitted wavebands of a plurality of correction filter units are arranged at equal intervals, for example, if six transmitted wavebands are band-pass filters of 40 nm having a wavelength interval of 20 nm, the transmitted wavebands are 420 nm-460 nm, 480 nm-520 nm, 600 nm-640 nm, 660 nm-700 nm and 720 nm-760 nm, respectively. If four characteristic filter units are included, a spectral power distribution of a bandwidth of 10 nm may be obtained within each transmitted waveband according to the method for obtaining the spectral power distribution.

(b) Or, a plurality of correction filter units is arranged according to a deviation region distribution. Within the detection waveband, wavebands within which a direct deviation or weighted deviation between the combined spectral responsivity function and the corresponding theoretical characteristic function is greater than a preset value are determined as deviation regions. One or more deviation regions are included within the detection waveband, and the correction filter units are arranged within the deviation regions. Theoretical response values are obtained by using the calculated spectral power distribution and the theoretical characteristic functions, and the total response value is corrected by using deviations between the theoretical response values and the measured response values. It is to be noted that, the deviation regions may be directly determined from the deviations between the actual spectral response functions and the theoretical characteristic functions; or, considering the influence from the spectral power distribution of the object to be detected, the deviation regions are determined according to the weighted deviations between the both. In the latter solution, since the accurate spectral power distribution of the light source to be detected cannot be obtained, the premise of this solutions is that the experience spectral power distribution of the light to be detected (for example, majority of incandescent lamps have a successive spectral power distribution, the blue light of LED lamps have peaks, and so on) is known to determine the deviation regions.

In the present invention, each of the detection units is a minimum set of photoelectric convertors for obtaining the response values of the light to be detected, and may consist of one or more single-channel photoelectric detectors. Or, the detection units are various photoelectric detection devices such as multi-channel photoelectric detectors. Silicon photocells are one of typical single-channel photoelectric detectors. During the colorimetric measurement, three color filters for simulating CIE tristimulus value matching functions $R(\lambda)$, $G(\lambda)$ and $B(\lambda)$ are placed in front of the silicon photocells, so that tristimulus values, i.e., three response values, are obtained. However, since there is a large difference between the actual combined spectral response function and the CIE tristimulus value matching function, the accurate colorimetric measurement cannot be realized. By the measurement method provided by the present invention, by placing a small number of correction filter units (e.g., bans-pass filters) in the light path, the correction of tristimulus values may be realized; moreover, the operation is simple, the cost is low and the measurement accuracy is high.

The CCD is a typical multi-channel photoelectric detector. At present, the color measurement is generally realized by a color CCD with a simulation color response characteristic. Different color responses correspond to the different characteristic filter units described above, and band-pass filters are placed in front of the color CCD. According to the spectral measurement method disclosed by the present invention, a spectral power distribution (i.e., a hyper-spectrum) on each color pixel under different band-pass filters may be obtained. In the conventional technical solutions for obtaining a hyper-spectrum, by providing a plurality of narrow-waveband band-pass filters in front of a monochrome CCD, the average spectral power under this narrow waveband is obtained. However, in the technical solutions of the present invention, multiple average spectral powers under a wide waveband are calculated by band-pass filters within this wide waveband and by using response waves of the color pixels. As described above, by selecting a plurality of sampling points, multiple average spectral powers of the band-pass filters under this wide waveband can be obtained, so that the spectral power distribution is refined. Specifically, if it is expected to realize a spectral power with a bandwidth of 10 nm within a visible light waveband (380 nm to 780 nm), 40 band-pass filters of 10 nm are required to obtain the average spectral power with a bandwidth of 10 nm in the conventional technical solutions. However, in the technical solutions of the present invention, since the color CCD is an array detector for simulating $R(\lambda)$, $G(\lambda)$ and $B(\lambda)$ responses and a through hole is additionally provided, it is equivalent to provide a color filter having a constant spectral response function of 1, and there are total four constraints. If it is expected to realize a spectral power with a bandwidth of 10 nm, six band-pass filters of 40 nm are required. Thus, under the premise of ensuring the measurement accuracy, the number of band-pass filters is reduced greatly, the measurement system is simplified, the measurement efficiency is improved, and the measurement cost is decreased.

The present invention has the following beneficial effects: by introducing a small number of correction light filter units, the spectral power distribution within the entire waveband to be detected can be obtained without using dispersion elements or a large number of narrow waveband color filters. Moreover, this method can further use the spectral power distribution to correct a measurement deviation resulted from the difference between an actual spectral response function and a theoretical spectral response function, so as to restore information in aspects such as the actual color and brightness of the object to be detected. This method can be applicable to almost all types of detectors, and has the characteristics of simple operation, low cost, fast response speed and high measurement accuracy.

BRIEF DESCRIPTION OF THE DRAWINGS

To describe the technical solutions in the embodiments of the present invention or in the prior art more clearly, the accompanying drawings to be used in the descriptions of the embodiments or the prior art will be briefly described below. Apparently, the drawings described hereinafter are merely some of embodiments of the present invention, and a person of ordinary skill in the art can obtain other drawings according to these drawings without any creative effort.

DETAILED DESCRIPTION OF EMBODIMENTS

Embodiment 1

Figure 1:
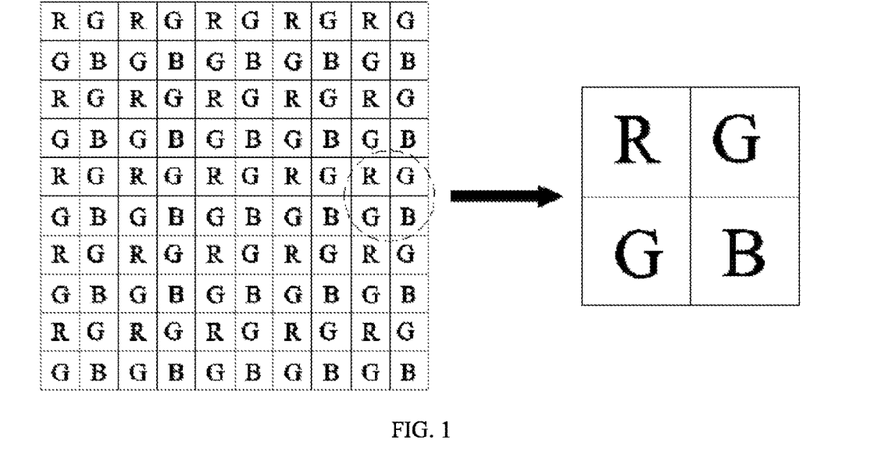
FIG. 1 is a schematic diagram of a pixel response of a color CCD.

This embodiment provides an optical radiation measurement method based on light filter units, including a detection unit 1, three characteristic filter units 2 and five correction filter units 3. The correction filter units 3 are band-pass filters having transmitted wavebands at an interval of 60 nm. As shown in FIG. 1, the detection unit 1 is an array detector, the array detector and the three characteristic filter units 2 constitute a color CCD, and the combined spectral response functions are R $(\lambda)$, G$(\lambda)$ and B $(\lambda)$, respectively.

Figure 2:
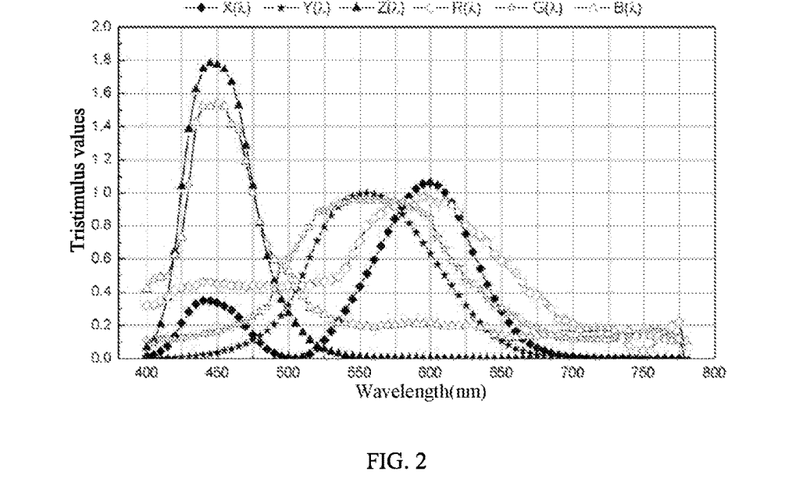
FIG. 2 is a schematic diagram of a color matching function and an actual response function of the color CCD.

As shown in FIG. 2, the five correction filter units 3 divide a detection waveband into 9 regions, i.e., 400 nm-460 nm, 460 nm-480 nm, 480 nm-540 nm, 540 nm-560 nm, 560 nm-620 nm, 620 nm-640 nm, 640 nm-700 nm and 700 nm-760 nm, wherein the transmitted wavebands of the correction filter units 3 are 400 nm-460 nm, 480 nm-540 nm, 560 nm-620 nm, 640 nm-700 nm and 700 nm-760 nm, respectively, and the corresponding transmittances are $\tau_1(\lambda)$, $\tau_2(\lambda)$, $\tau_3(\lambda)$, $\tau_4(\lambda)$ and $\tau_5(\lambda)$, respectively. For the transmitted wavebands and the non-transmitted wavebands, a spectral power distribution can be obtained in the present invention, so that a spectral power distribution of the whole detection waveband can be obtained. The specific process is as follows.

For the spectral power distribution of a transmitted waveband, taking 400 nm-460 nm as example, three measured response values $R_1$, $G_1$ and $B_1$ are obtained by a combination of the same correction filter units 3 having a transmittance of $\tau_1(\lambda)$ and three characteristic filter units 2, and three sampling regions, i.e., 400 nm-420 nm, 420 nm-440 nm and 440 nm-460 nm, are selected within the waveband of 400 nm-460 nm. Then, $\Delta\lambda_1$, $\Delta\lambda_2$ and $\Delta\lambda_3$ are 20 nm, $P(\lambda_1)$, $P(\lambda_2)$ and $P(\lambda_3)$ are the average spectral power of the wavebands 400 nm-420 nm, 420 nm-440 nm and 440 nm-460 nm, respectively, and R$(\lambda_1)$, G$(\lambda_1)$, B$(\lambda_1)$ are the average value of the combined spectral responsivity of the detection unit 1 and characteristic filter units 2 within the wavebands 400 nm-420 nm, 420 nm-440 nm and 440 nm-460 nm, respectively. Thus, a simultaneous equations system of three measured response values is as follows:

$$\begin{cases} R_1 = P(\lambda_1)R(\lambda_1)\tau_1(\lambda)\Delta\lambda_1 + P(\lambda_2)R(\lambda_2)\tau_1(\lambda)\Delta\lambda_2 + P(\lambda_3)R(\lambda_3)\tau_1(\lambda)\Delta\lambda_3 \\ G_1 = P(\lambda_1)G(\lambda_1)\tau_1(\lambda)\Delta\lambda_1 + P(\lambda_2)G(\lambda_2)\tau_1(\lambda)\Delta\lambda_2 + P(\lambda_3)G(\lambda_3)\tau_1(\lambda)\Delta\lambda_3 \\ B_1 = P(\lambda_1)B(\lambda_1)\tau_1(\lambda)\Delta\lambda_1 + P(\lambda_2)B(\lambda_2)\tau_1(\lambda)\Delta\lambda_2 + P(\lambda_3)B(\lambda_3)\tau_1(\lambda)\Delta\lambda_3 \end{cases}$$

In accordance with the equations, $P(\lambda_1)$, $P(\lambda_2)$ and $P(\lambda_3)$ can be calculated, that is, the average spectral power distribution corresponding to the wavebands 400 nm-420 nm, 420 nm-440 nm and 440 nm-460 nm are calculated. Similarly, under the different correction filter units 3, the spectral power distribution within the transmitted wavebands of all the correction filter units 3 are obtained.

Within the detection waveband, within the wavebands (i.e., 460 nm-480 nm, 540 nm-560 nm and 620 nm-640 nm) beyond the transmitted wavebands of the correction filter units 3, a deviation between the sum of measured response values obtained after successively placing five correction filter units 3 into the optical path and the total measured response value when the correction filter units 3 is not placed into the optical path are used as a measured response value of the wavebands, and then three measured response values are obtained under different characteristic filter units 2. The wavebands 460 nm-480 nm, 540 nm-560 nm and 620 nm-640 nm are used as sampling regions, and a simultaneous equations system of the three measured response values is as follows:

$$\begin{cases} R - \sum_{i=1}^{5} \frac{R_i}{\tau_i(\lambda)} = P'(\lambda_1)R'(\lambda_1)\Delta\lambda'_1 + P'(\lambda_2)R'(\lambda_2)\Delta\lambda'_2 + P'(\lambda_3)R'(\lambda_3)\Delta\lambda'_3 \\ G - \sum_{i=1}^{5} \frac{G_i}{\tau_i(\lambda)} = P'(\lambda_1)G'(\lambda_1)\Delta\lambda'_1 + P'(\lambda_2)G'(\lambda_2)\Delta\lambda'_2 + P'(\lambda_3)G'(\lambda_3)\Delta\lambda'_3 \\ B - \sum_{i=1}^{5} \frac{B_i}{\tau_i(\lambda)} = P'(\lambda_1)B'(\lambda_1)\Delta\lambda'_1 + P'(\lambda_2)B'(\lambda_2)\Delta\lambda'_2 + P'(\lambda_3)B'(\lambda_3)\Delta\lambda'_3 \end{cases}$$

Figure 3:
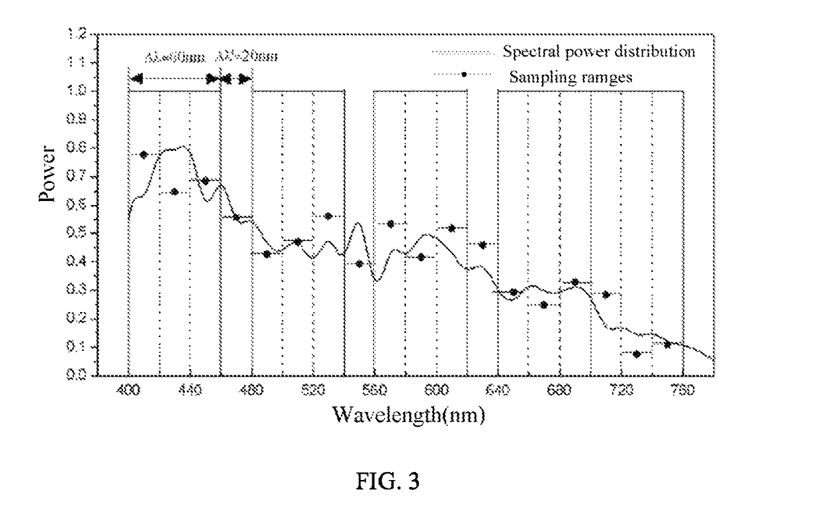
FIG. 3 shows the comparison of a spectral power distribution obtained by correction filter units and an actual spectral power distribution.

In accordance with the equations, the average spectral power within the wavebands 460 nm-480 nm, 540 nm-560 nm and 620 nm-640 nm is calculated, and then a spectral power distribution within the whole detection waveband can be obtained in combination with the spectral power distribution within the transmitted wavebands of each correction filter unit (3). As shown in FIG. 3, "·····●·····" denotes the average spectral power within the sampling regions, the solid line denotes the theoretical spectral power distribution. It can be seen by comparing the both that the spectral power distribution within the waveband to be detected can be accurately obtained by the optical radiation measurement method provided by the present invention, without using any devices such as a spectrometer. Similarly, the spectral power distribution within the detection waveband and beyond the transmitted wavebands can be obtained by this method, so that the spectral power distribution within the whole detection waveband is obtained.

After the spectral power distribution of the object to be obtained is obtained, the response value of the detection unit 1 (i.e., the photometric and colorimetric quantities of the object to be detected) is further corrected by using the spectral power distribution. Taking a certain characteristic filter unit 2 having a combined spectral response function $R(\lambda)$ with the detection unit (1) as example, a measured response value $R_1$ is obtained under a certain correction filter unit 3 (for example, a transmitted waveband of 400 nm-460 nm). Then, a theoretical response value $R_1'$ of this characteristic filter unit 2 is obtained according to the theoretical characteristic function $X(\lambda)$ corresponding to this characteristic filter unit 2:

$$R_1'=P(\lambda_1)X(\lambda_1)\tau_1(\lambda)\Delta\lambda_1+P(\lambda_2)X(\lambda_2)\tau_1(\lambda)\Delta\lambda_2+P(\lambda_3)X(\lambda_3)\tau_1(\lambda)\Delta\lambda_3.$$

Thus, a response deviation of this correction filter unit is $\Delta R_1=R_1'-R_1$, and the total measured response value R of this characteristic filter unit 2 when no correction filter unit 3 is placed into the light path can be corrected by using the response deviation. Further, the correction can be performed in different correction filter units 3, and the corrected total measured response value R' is obtained by using the total correction deviation:

$$R' = R + \sum_{i=1}^{5} \Delta R_1.$$

Similarly, the measured response values under different characteristic filter units 2 can be corrected by the correction method to obtain accurate measured values.

TABLE 1

The measured response values, corrected values and theoretical values under different characteristic filter units 2

| Characteristic response value | Measured value | Corrected value | Theoretical value |
|---|---|---|---|
| R | 116.50 | 81.01 | 84.89 |
| G | 69.90 | 51.63 | 48.34 |
| B | 82.23 | 71.21 | 71.71 |

It can be seen from the table that, in comparison with the measured values, the corrected response values can accurately reflect the real theoretical response values. That is, the correction method can obtain more accurate response values.

Embodiment 2

Figure 4:
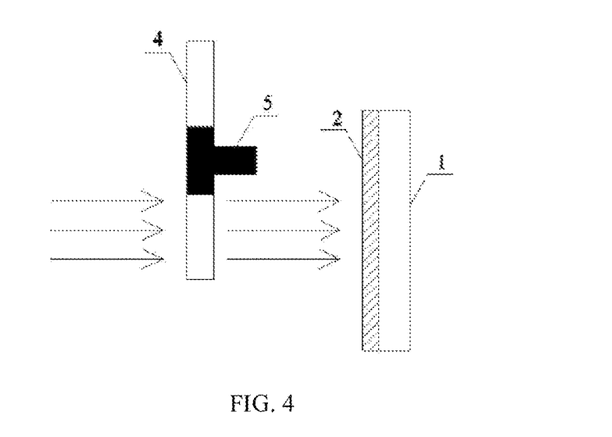
FIG. 4 is a schematic diagram of an optical radiation measurement apparatus based on a light filter unit.
Figure 5:
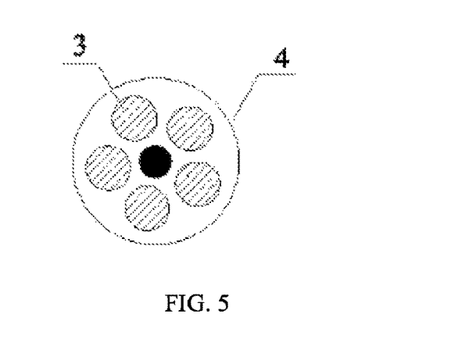
FIG. 5 is a schematic diagram of correction filter units arranged on a correction wheel, in which:
1: detection unit;
2: characteristic filter unit;
3: correction filter unit;
4: correction wheel; and
5: driving mechanism.

This embodiment provides an optical radiation measurement apparatus based on light filter units, including a detection unit 1, four characteristic filter units 2, five correction filter units 3, a correction wheel 4 and a driving mechanism 5. The correction filter units 3 are band-pass filters having transmitted wavebands at an interval of 60 nm. The five correction filter units 3 are arranged on the correction wheel 4, and successively placed into the light path by the driving mechanism 5. The correction wheel 4 and the characteristic filter units 5 are successively arranged inward relative to the detection unit 1. The detection unit 1 is an array detector. The characteristic filter units 2 include three color filters and a through hole. The three color filters and the array detector constitute a color CCD, and the combined spectral response functions of the three color filters and the array detector are $R(\lambda), G(\lambda)$ and $B(\lambda)$, respectively. The characteristic filter units 2 and the correction filter units 3 are placed in front of the detection unit 1, and light goes through the correction filter units 3 and characteristic filter units 2 and is then received by the detection unit 1. A specific test method is the same as that in Embodiment 1.

The description of the embodiments described above enables those skilled in the art to implement or use the present invention. It is apparent for those skilled in the art to make various modifications to those embodiments, and the general principle defined in the present invention can be realized in other embodiments without departing from the spirit or scope of the present invention. Therefore, the present invention is subject to the widest scope conforming to the principle and novelty disclosed herein, rather than the embodiments described herein.

What is claimed is:

1. An optical radiation measurement method based on light filter units, comprising one or more detection units, n ($n \geq 2$) characteristic filter units, and m ($m \geq 2$) correction filter units; the combined spectral responsivity of the detection unit and the characteristic filter units and the transmittance of the correction filter units are known; the characteristic filter units and the correction filter units are provided in front of the detection units; the method comprising the following steps:

obtaining, by said one or more detection units, a plurality of measured response values of an object to be detected;

selecting one or more sampling regions within a waveband to be measured; and calculating a spectral power distribution within the waveband to be measured according to a corresponding simultaneous equations system of equations of expressions of the measured response values.

2. The optical radiation measurement method based on light filter units according to claim 1, wherein that a corresponding waveband to be measured is determined by a combination of the m correction filter units, and the spectral power distribution of the waveband to be measured is obtained by the following specific steps:

a) acquiring a certain measured response value under a same characteristic filter unit and one or more correction filter units, and acquiring n measured response values within the waveband to be measured under different characteristic filter units; and b) selecting w ($1 \leq w \leq n$) sampling regions within the waveband to be measured, selecting w measured response values to establish a simultaneous equations system, and calculating the average power in the sampling regions.

3. The optical radiation measurement method based on light filter units according to claim 1, wherein that a theoretical characteristic function corresponding to the characteristic filter units is known, and the measured response values of the detection units are corrected by the spectral power distribution:

a) no any correction filter unit is placed into the light path, and a measured full-waveband response value within the whole waveband to be measured is obtained under a specified characteristic filter unit;

b) under the same characteristic filter units, the measured response values in different wavebands to be detected are obtained, and theoretical response values are calculated according to the spectral power distribution within a plurality of correction wavebands and corresponding theoretical characteristic functions, so that a response value deviation within each of the plurality of correction wavebands is obtained; and c) the measured full-waveband response value is corrected by using the response value deviation in (b) to obtain a corrected full-waveband response value.

4. The optical radiation measurement method based on light filter units according to claim 3, wherein that the measured response values of the detection units are corrected by using a spectral mismatch correction coefficient which is obtained from the spectral power distributions of the object to be detected and a calibration light source, the theoretical characteristic functions, and the combined spectral responsivity of the detection units and the characteristic filter units.

5. The optical radiation measurement method based on light filter units according to claim 3, wherein that one or more deviation regions are contained within a detection waveband; the correction waveband is within the deviation regions, and the deviation regions are wavebands within which a direct deviation or weighted deviation between the combined spectral responsivity function of the detection units and the characteristic filter units and the corresponding theoretical characteristic function is greater than a preset value.

6. The optical radiation measurement method based on light filter units according to claim 1, wherein that the waveband to be measured is a transmitted waveband of each correction filter unit within a detection waveband; or, the waveband to be measured is a waveband beyond the combined waveband of the m correction filter units within a detection waveband.

7. The optical radiation measurement method based on light filter units according to claim 1, wherein that the wavebands to be detected are arranged within a detection waveband at equal central wavelength intervals.

8. The optical radiation measurement method based on light filter units according to claim 1, wherein that the correction filter units are a combination of band-pass filters and/or long-pass filters and/or short-pass filters.

9. The optical radiation measurement method based on light filter units according to claim 1, wherein that each of the detection units consists of one or more single-channel photoelectric detectors; or, each of the detection units is a multi-channel photoelectric detector.

10. The optical radiation measurement method based on light filter units according to claim 1, wherein that the detection units are array detectors, and the array detectors and the characteristic filter units constitute a color CCD.

11. An optical radiation measurement apparatus for implementing claim 1, comprising said one or more detection units, said n (n≥2) characteristic filter units and said m (m≥2) correction filter units, wherein the characteristic filter units and the correction filter units are placed in front of the detection units to allow light to go through the correction filter units and the characteristic filter units and to reach the detection units.

12. The optical radiation measurement apparatus according to claim 11, wherein that the correction filter units are band-pass filters; or, the correction filter units are a combination of band-pass filters and/or long-pass filters and/or short-pass filters.

13. The optical radiation measurement apparatus according to claim 11, wherein that the number m of the correction filter units satisfies the following condition: m≤10.

14. The optical radiation measurement apparatus according to claim 11, further comprising a correction wheel, wherein that the correction filter units are arranged on the correction wheel; and different correction filter units are placed into the light path in front of the detection units by rotating the correction wheel.

15. The optical radiation measurement apparatus according to claim 11, wherein that each of the detection units consists of one or more single-channel photoelectric detectors; or, each of the detection units is a multi-channel photoelectric detector.

16. The optical radiation measurement apparatus according to claim 11, wherein that the detection units are array detectors, and the array detectors and the characteristic filter units constitute a color CCD.

17. The optical radiation measurement apparatus according to claim 11, wherein that each of the characteristic filter units comprises a color filter having a spectral response function of 1, i.e., a through hole.

18. The optical radiation measurement apparatus according to claim 11, wherein that the characteristic filter units are three characteristic filter units for simulating CIE tristimulus values.

* * * * *